United States Patent [19]

Pond et al.

[11] 4,329,059

[45] May 11, 1982

[54] MULTIPLE CHANNEL INTERFEROMETER

[75] Inventors: Charles R. Pond, Federal Way; Patrick D. Texeira, Renton; Reynold E. Wilbert, Seattle, all of Wash.

[73] Assignee: The Boeing Company, Seattle, Wash.

[21] Appl. No.: 126,959

[22] Filed: Mar. 3, 1980

[51] Int. Cl.³ .......................... G01B 9/02; G02B 27/10
[52] U.S. Cl. ................................ 356/353; 350/162 SF; 350/174
[58] Field of Search ...................... 356/351, 353; 350/162 SF, 172, 174

[56] References Cited

U.S. PATENT DOCUMENTS

| | | | |
|---|---|---|---|
| 2,997,841 | 4/1961 | Kaufmann et al. | 368/175 |
| 3,225,644 | 12/1965 | Schuch | 356/358 |
| 3,359,851 | 12/1967 | Lipschutz et al. | 356/358 |
| 3,359,852 | 12/1967 | Wilczynski et al. | 356/359 |
| 3,458,259 | 7/1969 | Bagley et al. | 356/349 |
| 3,523,735 | 8/1970 | Taylor | 356/349 |
| 3,767,307 | 10/1973 | Bowker | 356/349 |
| 3,780,217 | 12/1973 | Sawatari | 178/6 |
| 3,788,746 | 1/1974 | Baldwin et al. | 356/349 |
| 3,790,284 | 2/1974 | Baldwin | 356/349 |
| 3,877,813 | 4/1975 | Hayes et al. | 356/349 |
| 3,938,889 | 2/1976 | McKinnis | 356/357 |
| 3,970,389 | 7/1976 | Mendrin et al. | 356/45 |
| 4,005,936 | 1/1977 | Redman et al. | 356/45 |
| 4,018,531 | 4/1977 | Leendertz | 356/360 |
| 4,105,336 | 8/1978 | Pond | 356/113 |
| 4,165,182 | 8/1979 | Vilkomerson | 356/349 |

OTHER PUBLICATIONS

Pond et al., "Multiple Channel Interferometer for Metrology" App. Optics, 9-1971, pp. 2144-2149.

*Primary Examiner*—William H. Punter
*Attorney, Agent, or Firm*—Delbert J. Barnard; Eugene O. Heberer; Joan H. Pauly

[57] ABSTRACT

A filter and beam combiner is comprised of a small glass plate having a microscopic two sided elliptical mirror on one side thereof. The signal beam is spatially filtered on one side of the mirror and then directed to a target. On the other side of the mirror there is a compensating glass plate through which the reference beam passes, to correct for refraction relative to its passing through the first plate, before it enters the other glass plate and is directed onto said other side. The reference beam is spatially filtered by the mirror for combination with the signal beam, which returns from the target substantially enlarged by diffraction so as to pass around the mirror and through the plate to be combined with the reference beam.

The signal beam is passed through acousto-optic modulator (AOM). The reference beam is passed through an 81 MHz AOM. The AOM's produce a doppler shift of the coherent light source frequency as the light is diffracted by a moving sound wave in the modulator. When the two beams are combined, the fringe position is proportional to the phase of the 1 MHz frequency modulation difference frequency.

The signal beam and the reference beam are combined as the former passes around the mirror and the latter is reflected thereby, forming a composite beam to form interference patterns, and from which can be extracted, with extremely high resolution, information concerning the physical characteristics of the target.

22 Claims, 6 Drawing Figures

MULTIPLE CHANNEL INTERFEROMETER

BACKGROUND OF THE INVENTION

The invention relates to multiple channel interferometers for use for example, as dilatometers as needed for advanced measurement capability in the field of low-expansion structural hardware.

In the prior art, the first multichannel interferometer, known to applicants, was a modified Twyman-Green interferometer using a single laser source and wavefront division to develop seven measurement beams. The fringe counting rate was 4 KHz. The major problems with this interferometer were dropouts due to low fringe rate capability, channel to channel drift because of a large diameter beam splitter. and laser noise resulting from optical feedback thereto. The above interferometer is described in "Multichannel Interferometer For Metrology" C. R. Pond, M. H. Horman, and P. D. Texeira, *Applied Optics*, Vol. 10, No. 9, September 1971.

An improvement of the above interferometer is disclosed in U.S. Pat. No. 4,105,336. The interferometer described in the patent was used successfully to test several graphite-epoxy structural elements with respect to expansion. As the testing became more demanding it became apparent that the fringe bandwidth was inadequate. Vibration of the test articles sometimes produced fringe rates in excess of the 4 KHz fringe bandwidth. In attempts to overcome the foregoing problems the fringe rate was changed from 4 KHz to 100 KHz, and in order to partially compensate for the bandwidth increase, the retroreflector diameter was increased from 3 mm to 10 mm, producing an order to magnitude greater signal. This high fringe rate was found to be beyond the capability of the piezoelectrically driven spatial filter, beam combiner and modulator 71 disclosed in U.S. Pat. No. 4,105,336. The present invention was conceived and developed to overcome the foregoing problems.

Other prior art known to the applicants that may be pertinent is U.S. Pat. No. 3,780,217 in which acousto-optic frequency shifting devices are employed.

SUMMARY OF THE INVENTION

In order to overcome the above stated prior art problems, applicants conceived and developed a new spatial filter and beam combiner in which only one microscopic elliptical mirror is used to direct the incident signal beam to the target and to direct the incident reference beam to the area where it is combined with the returning signal beam.

In addition acousto-optic modulators (AOM) here used in the signal and the reference beams produce a doppler shift of the laser frequency as the light is diffracted by a moving sound wave in the modulator. The signal beam AOM has a frequency of 80 MHz and the reference beam AOM has a frequency of 81 MHz. When the signal and reference beams are combined, the fringe position is proportional to the phase of the one MHz phase modulated difference frequency.

The AOM's and the new spatial filter and beam combiner were used in a new 19 channel interferometer developed according to the invention.

It was suprisingly found in the creation of the present invention that optical feedback into the laser with a single mirror filter and beam combiner does not create a laser noise problem. The 161 MHz doppler shift of the return beams is only 10% of the 1600 MHz gain bandwidth of the helium-neon used but the return beams are strongly rejected by the laser cavity.

Accordingly, it is an object of the present invention to provide an improved multichannel interferometer in which there is no laser feedback problem.

It is another object of the present invention to provide a new spatial filtering and beam combining device in which a two sided microscopic elliptical mirror is positioned on a light transmitting plate, there being a compensating light transmitting plate on the otherside of the first plate to receive the reference beam to compensate for the wavefront distortion during its travel through the first plate to the back side of the mirror from which it is reflected.

It is still another object of the invention to provide an interferometer having a beam combining device in which the reference beam is not directed to the target.

Further objects and advantages of the invention may be brought out in the following part of the specification wherein small details have been described for the completion of disclosure, without intending to limit the scope of the invention which is set forth in the appended claims.

BRIEF DESCRIPTION OF THE DRAWINGS

Referring to the accompanying drawings which are for illustrative purposes.

DESCRIPTION OF THE PREFERRED EMBODIMENT

Figure 1:
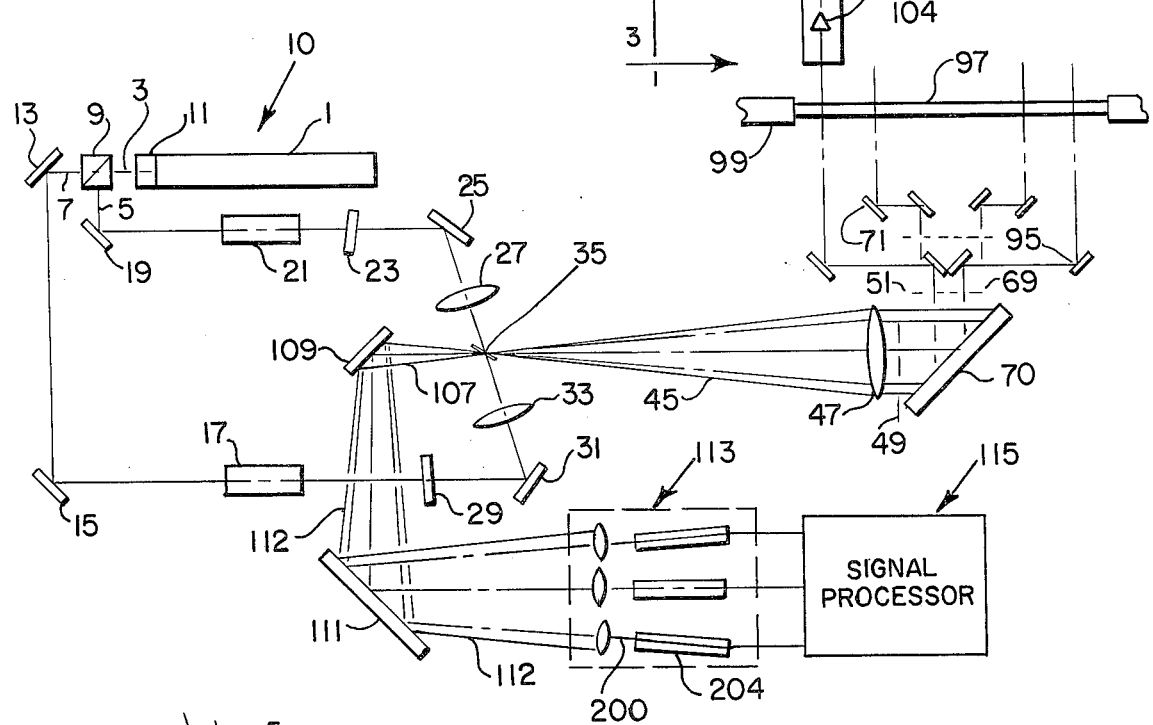
FIG. 1 is an optical schematic view of the interferometer according to the invention.
Figure 2:
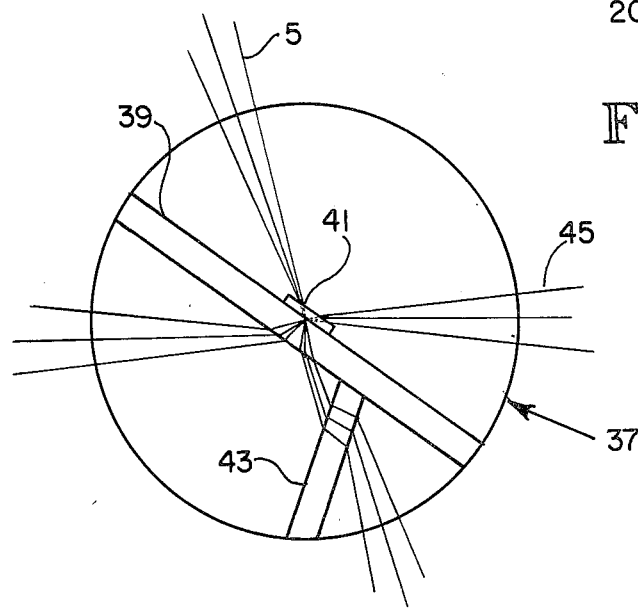
FIG. 2 is an enlarged detailed view of a new filter and beam combiner assembly.
Figure 3:
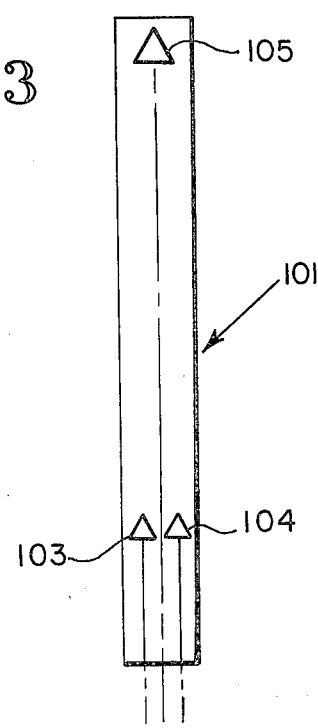
FIG. 3 is an fragmentary view taken along the lines 3—3 of FIG. 1.

Referring again to the drawings, there is shown in FIGS. 1–3 an interferometer, generally designated as 10, in the form of a dilatometer, as used for measuring the expansion coefficient of graphite-epoxy specimens. Laser 1 generates a beam of coherent light 3 which is split into a signal beam 5 and reference beam 7 by a polarizing beam splitter 9.

The splitting ratio is determined by the orientation of the polarization rotator 11 on the end of the laser 1. Mirrors 13 and 15 are positioned to control the direction of the reference beam 7 at an entrance aperture of an acousto-optical modulator (AOM) 17 to maximize the laser power in the first order beam. Similarly, the splitter 9 and mirror 19 control the position and direction of the signal beam 5 at AOM 21. The frequency of AOM 21 is 80 MHz and the optical frequency of the signal beam is thereby doppler shifted by 80 MHz. The frequency of the AOM 17 is 81 MHz and the reference beam is doppler shifted by that amount. The amount of doppler shifting of the two beams 5, 7 is sufficient to prevent a problem in laser 1 caused by optical feedback into laser 1.

A tilt plate 23 and a mirror 25 control the position and direction of the signal beam 5 at the aperture of a focusing lens 27. Similarly, a tilt plate 29 and a mirror 31 control the position and direction of the reference beam 7 to the lens 33. The lenses 27 and 33 focus the signal beam and reference beam onto a beam cleaning filter and combiner assembly 35.

An enlarged view of the filter and combiner assembly is shown in FIG. 2 within the circle 37. The assembly is comprised of a thin glass plate 39, having a thickness of about 0.004". Centrally positioned on one side of the plate 39 is a two-sided elliptical mirror 41. Plate 39 is oriented at Brewster's angle to the center line of the incident signal beam in order to suppress Fresnel reflection for light polarized in the plane of incidence.

A compensating glass plate 43 of the same thickness as the plate 39 is positioned on the opposite side thereof from the mirror so that the incident reference beam 7 passes through the plate 43 at Brewster's angle and reflects on the rear surface of the elliptical mirror 41. The plate 43 compensates for the beam distortion in the reference beam 7 caused by transmission through the plate 39 to the mirror 41.

The compensating plate could be omitted if the plate 39 were thin enough so that there would be no appreciable wavefront distortion of the reference beam. However, if the plate 39 were made that thin it would be very difficult to handle.

The mirror 41 is microscopic in size and the dimensions (major axis—10 microns, minor axis—7 microns) are selected so that the mirror acts as a spatial filter or a beam cleaner. The mirror 41 is a reflection analog of a pinhole-type spatial filter commonly used in the laser art.

Reflected from the mirror 41, the filtered signal beam 45 is collimated by a lens 47. An aperture plate 49 is positioned adjacent the lens 47 and has nineteen 0.5" apertures therein so as to divide the signal beam 45 into nineteen 0.5" diameter test beams, indicated as at 51–69. Adjacent the aperture plate 49 is a mirror 70 which folds the beams 51–69 onto relaying mirrors 71–95. Only 4 of the 19 test beams are shown and only 8 of the relaying mirrors are shown. The test beams are relayed by the mirrors through an optical window 97 of a test chamber 99 which is shown fragmentarily.

Six graphite-epoxy test specimens are usually mounted in the chamber 99 but only one test specimen 101 is shown. Three cube corner reflectors are attached to each test specimen, two at the bottom, 103, 104 and one at the top, 105, FIGS. 1 and 3. Each cube corner reflector reflects one test beam back to the filter-combiner assembly 35, 37.

Because of the diffraction effects, the diameter of the returning beams is large compared to the diameter of the mirror 41 so that test beams 51–69 pass through the plate 39 around the mirror and combine with the filtered reference beam 107. Mirrors 109 and 111 are positioned to fold the combined beams 112 and direct them to detector assembly 113. The detector assembly contains 19 lenses to focus the beams onto 19 detectors which are photomultiplier tubes 204. Each combined reference and signal beam is indicated as 200 in the detector assembly. Detected signals pass to a signal processor 115 which is shown in more detailed in FIG. 4.

Figure 4:
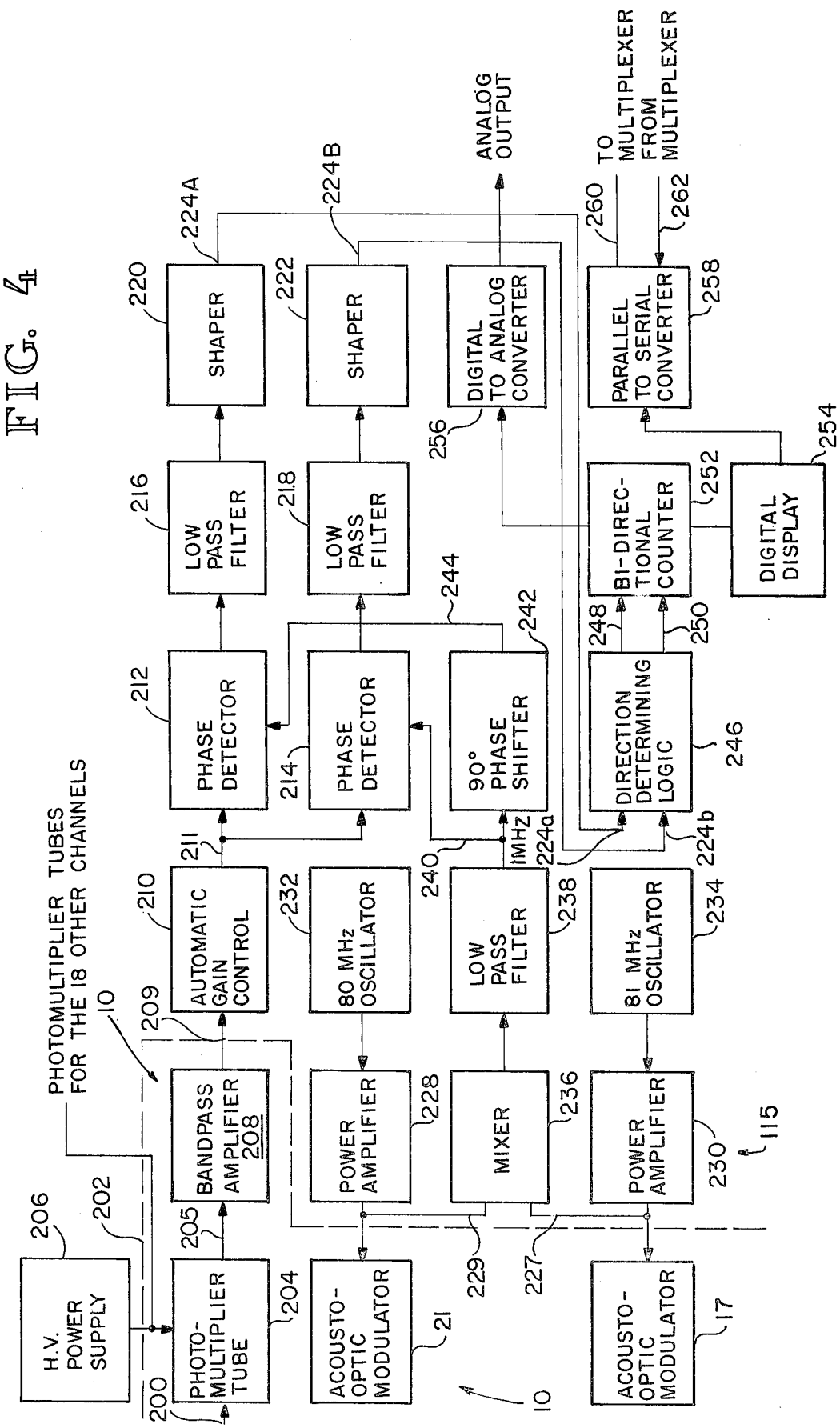
FIG. 4 is a block diagram of a signal processor for a single channel of a multichannel interferometer.

In FIG. 4 the optical assembly 10 is shown only in part on the left side of and below the broken line 202. A photomultiplier tube 204 for one combined beam is shown, as are the AOM's 21 and 17.

The signal processor is a multichannel digital phase meter where the phase is accumulated in 90° increments. Because the optical frequency of the signal and reference beams was shifted by 80 MHz and 81 MHz by the AOM's 21 and 17, respectively, the superimposed signal and reference beams, therefore, produce a one MHz difference frequency when detected with the square law detectors. This difference frequency is phase modulated by changes in the optical lengths of the signal beam paths. The signal phase shifts by $2\pi$ relative to the difference frequency of the 80 MHz and 81 MHz drivers when the round trip optical path changes by one wave length of the laser light. The processor uses a quadrature technique to produce four counts per cycle so that one count represents $\frac{1}{8}$ of a wavelength change in the axial position of a corner reflector on a specimen.

Considering FIG. 4 in detail, with no phase shift occurring the frequency difference signal and reference light frequencies is the difference in frequency between oscillator 232 and 234. The squaring property of the photomultiplier results in a frequency difference component at its output 204 of 1 MHz, the difference in frequency between oscillator 232 and 234. High voltage power supplier 206 is adjustable and provides operating voltage for all of the photomultipliers.

With a difference frequency of 1 MHz adequate radio frequency isolation must be provided between channels. A highly shielded bandpass amplifier 208 is capable of driving a 50 ohm transmission line 209 which is terminated into 50 ohms at the input to automatic gain control circuitry 210. It should be noted that a cable distance of approximately 20 feet exists between the optical assembly 10 and each signal processor unit.

The automatic gain control is provided to keep the input into phase detectors 212 and 214 constant for varying input light conditions, for example, laser output degradation, changes in quality of the retroreflectors, and window attenuation.

The reference phase needed for phase detection is derived by mixing the outputs from power amplifiers 228 and 230. A low pass filter 238 filters out the undesired frequency component fo the mixing process and passes the desired one MHz frequency component.

Because the phase change of the signal is bidirectional, relative to the reference signal, quadrature signals are generated using the two balanced modulator phase detectors 212 and 214 to enable determination of the direction of phase change and the instantaneous total phase. The signal 211 is applied to both phase detectors 212 and 214 but the reference 240 is applied to phase detector 214 directly and shifted in phase 90° by 90° phase shifter 242 before application to phase detector 212. Each phase detector multiplies the input applied to it. The outputs of the phase detectors 212 and 214, after filtering by the low pass filters 216 and 218, represent phase of the signal relative to the reference as a function of time. Because phase information is preserved in multiplication, the output of the balanced modulators is in quadrature. The low pass filters 216 and 218 filter out the undesired high frequency components from the balanced modulator outputs. Analog-to-digital shapers 220 and 222 change the analog output of the low pass filters to digital levels. The shapers 220 and 222 consist of a Schmitt trigger with adjustable hysterisis.

Figures 5, 6:
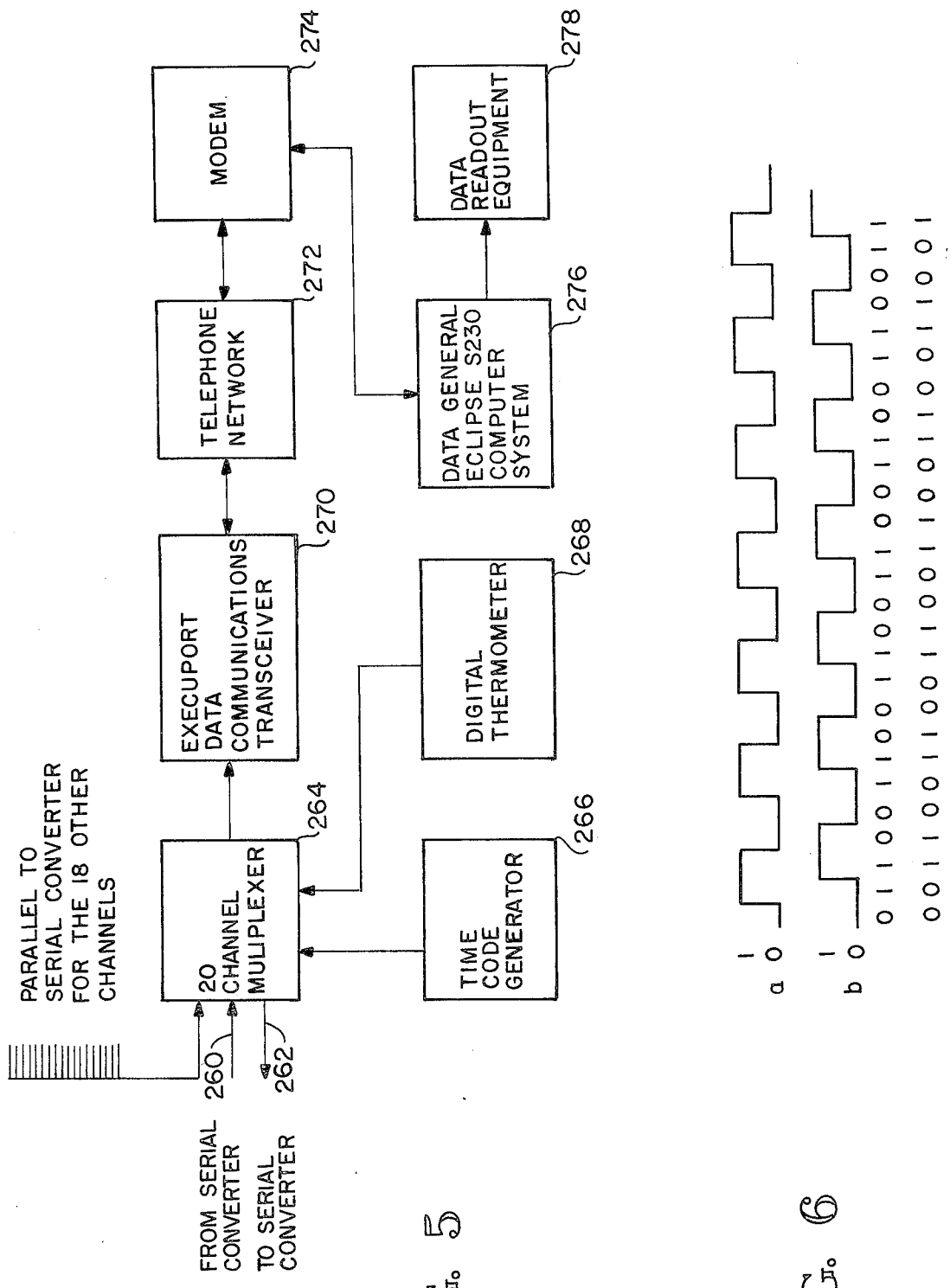
FIG. 5 is a block diagram of a data processor for the multichannel interferometer.
FIG. 6 is an illustration of quadrature wave shapes for a constant rate of change of phase for the signal relative to the reference and a corresponding logic states.

Quadrature outputs 224a and 224b are then applied to direction determining logic 246. In FIG. 6 quadrature waves are shown for a constant rate of change of phase for the signal relative to the reference and the corresponding logic states. It should be noted that a repetitive sequence exists. For example, assume at some instant in time, a is zero and b is zero. If the phase difference is increasing the next state for a is 1 and b would be zero. If the phase difference is decreasing, the next state for a is 0 and b would be 1. Examination of the sequence reveals that by knowing the previous level, determination of an increase or decrease in phase can be made. Note that each ¼ cycle of the quadrature signals is now identifiable. Thus, for every change in phase of a ¼ cycle the direction determining logic 246 provides a pulse from either output 248 and 250 depending upon whether the phase is increasing or decreasing to the bidirectional counter 252. The counter 252 and digital display 254 are capable of plus or minus $10^7$ minus 1 counts.

The cutoff frequency for the low pass filters 216 and 218 in the operational system was 100 KHz. Because of the quadrature detection and direction determining method the maximum count rate was 400 KHz, each count representing ¼ of the laser output wavelength. A digital-to-analog converter 256 provides an analog output from the four least significant bits of the bidirectional counter.

To minimize the number of lines to the data processing equipment from the signal processor, a parallel to serial converter 258 is provided in each channel module. The serial data 260 goes to the 20 channel multiplier. Data timing transfer synchronization signals 262 come from the 20 channel multiplexer.

In FIG. 5 the block diagram illustrates the data processor for the nineteen channel interferometer. The 20 channel multiplexer 264 is contained in an electronic assembly cabinet. The multiplexer 264 is the interface between the data out from each channel and a remote terminal data communications transceiver 270. Data is input to the multiplexer by manual command or automatically by the time code generator 266. On command the data from the bidirectional counter 252 is stored in a register which drives the display and the serial to parallel converter 258. The 20 channel multiplexer 264 sequentially interrogates each channel parallel to serial converters, incorporates the proper timing and format acceptable to the Execuport data communications transceiver 270 and transmits the new data form to the data communications transceiver. The Execuport transceiver 270 can print the data as formatted by the multiplexer or simultaneously transmit the data by telephone network 272 to a remote computer using its internal modem 274.

Time from a time code generator 266 is also multiplexed with the data. If less than 19 channels are used other data, such as output from a digital thermometer 268, can be multiplexed by replacing a channel module within an adaptor module.

At the remote computer a modem 274 demodulates the data and interfaces with the Data General Eclipse S230 Computer System 276. The computer is programmed to make the desired calculation and provide the desired readout 278. Computer data can be transmitted back to the Execuport Data Transceiver 270.

From the foregoing, it is clear that the unique filter combiner, along with the use of the AOM's is an interferometer eliminates any problems with regard to beam reflection back into the laser source. The combined structure also assures that the frings patterns developed by combining the returning signal beam with the incident reference beam, as made possible with the new structures, is due to the differences of signal path length of the signal beam alone and is not due to extraneous environmental factors. The high resolution multichannel interferometer in very successful as used as a dilatometer, the success being made possible by the unique structure described above.

The invention and its attendant advantages will be understood from the foregoing description and it will be apparent that various changes will be made in the form, construction, and arrangements of the parts of the invention without departing from spirit and scope thereof or sacrificing its material advantages, the arrangements herein before described being merely by way of example. We do not wish to be restricted to the specific forms shown or uses mentioned except as defined in the accompanying claims.

What is claimed is:

1. A device for use in an interferometer, in which in said interferometer an incident signal beam and an incident reference beam are produced by a common source, said device comprising:
   a first light transmitting plate, and
   a two sided reflecting means on one side of said plate,
      said plate being adapted to be in operating position in the interferometer,
   the plate and reflecting means in said position being adapted to filter the incident signal beam and reflect the same away from said one side of the plate by one side of said reflecting means, the incident signal beam being thereafter adapted to be collimated and directed to target,
   the other side of the reflecting means in said position being adapted to receive the incident reference beam through the plate from the other side thereof,
   the signal beam being adapted to return from the target enlarged with respect to said two sided reflecting means by diffractions so that it is adapted to pass around said last reflecting means and through said first plate and combine with the reference beam as it is reflected from the other side of the two sided reflecting means,
   whereby both beams are adapted to be directed to a detector assembly for obtaining useful information.

2. The device according to claim 1 including:
   a compensating, light transmitting plate adjacent and on the other side of the first plate from the reflecting means and adapted to receive the incident reference beam and direct it through the first plate to the other side of the reflecting means.

3. The device according to claim 2 which:
   said first and compensating plates are glass of the same thickness.

4. The device according to claim 1 in which:
   said two sided reflecting means is a two sided elliptical mirror of microscopic size so as to function as a spatial filter on both sides.

5. The device according to claim 2 in which:
   the first plate and two sided reflecting means in said position are at Brewster's angle with respect to the incident signal beam as received from the source, and
   the compensating plate being at Brewster's angle as it receives the incident reference beam from the source.

6. The device according to claim 1 including:

first means for passing the incident signal beam therethrough before it is reflected by the reflecting means, and second means for passing the incident reference beam therethrough before it is reflected by the reflecting means, said first means having a frequency different from said second means, whereby when the signal and reference beams are combined, the fringe position is proportional to the phase of the differences frequency.

7. The device according to claim 1 in which:

the incident signal beam passes through a first AOM before it is reflected by the reflecting means, and the incident reference beam passes through a second AOM before it is reflected by the reflecting means, said first AOM having a frequency different from said second AOM, whereby when the signal and reference beams are combined, the fringe position is proportional to the phase of the difference frequency.

8. The device according to claim 7 in which:

the frequency difference between the first and second AOM is 1 MHz.

9. The device according to claim 8 in which:

the frequency of the first AOM is 80 MHz and the frequency of the second AOM is 81 MHz.

10. The device according to claim 7 in which:

the beams are doppler shifted by the AOM's sufficiently so that the optical feedback into the source does not create a problem in the source.

11. An interferometer comprising:

a source of a coherent light beam, means to split the light beam into an incident signal beam and an incident reference beam, a frequency modulation means for each beam to shift the frequency from that of the source sufficiently so that the optical feedback to the source does not adversely affect its operation, means including combining means to direct the incident signal beam to a target, the signal beam being reflected from the target as a returning signal beam in the operation of the interferometer, said combining means being adapted to combine the returning signal beam with the incident reference beam to form a composite beam, said combining means including:

a first light transmitting plate in operating position in said interferometer adjacent said signal and reference beams, a two sided reflecting means on one side of said plate, the reflecting means being positioned so that the incident signal beam is substantially centered on one side thereof and reflected thereby away from said one side of the plate, the reflecting means being dimensioned so as to act as a spatial filter for the signal beam, the other side of the reflecting means in said position being adapted to receive the incident reference beam through the plate from the other side thereof, the signal beam being adapted to return from the target enlarged by diffraction with respect to said two sided reflecting means so that it is directed to pass around said two sided reflecting means and through said first plate to combine with the reference beam as it is reflected from the other side of the two sided reflecting means; and means detecting said composite beam, from which useful information may be obtained concerning the target.

12. The invention according to claim 11 including:

a compensating, light transmitting plate adjacent and on the other side of the first plate from the reflecting means and adapted to receive the incident reference beam to direct it to the approximate center of the other side of the reflecting means through the first plate.

13. The invention according to claim 11 in which:

said means detecting includes nineteen lenses to focus the beams onto nineteen detectors.

14. The invention according to claim 13 in which:

said detectors receive signals from said beams, and a signal processor for receiving signal from the detectors.

15. The invention according to claim 14 in which:

said signal processor is a multichannel digital phase meter, in which the phase is accumulated in 90° increments.

16. The invention according to claim 15 in which: the source frequency is shifted by said frequency modulation means so that a difference frequency is detected in square law detectors.

17. The invention according to claim 11 in which:

said frequency modulation means are AOM's which produce a doppler shift of the source frequency as the light is diffracted by a moving sound wave in the AOM.

18. The invention according to claim 11 in which:

said frequency modulation means for each beam have different frequencies so that when the beams are combined, the fringe position is proportional to the phase of the difference frequency.

19. The invention according to claim 17 in which:

the modulator for the signal beam is an 80 MHz AOM and the modulator for the reference beam is an 81 MHz AOM, the feedback beams being doppler shifted 161 MHz.

20. The invention according to claim 11 in which:

said first and compensating plates are glass of the same thickness.

21. The invention according to claim 11 in which:

said two sided reflecting means is a two sided elliptical mirror of microscopic size so as to function as a spatial filter on both sides.

22. The invention according to claim 11 in which:

the first plate and two sided reflecting means in said position are at Brewster's angle with respect to the incident signal beam as received from the source, and the compensating plate being at Brewster's angle as it receives the incident reference beam from the source.

* * * * *